United States Patent
Vise et al.

[11] 3,893,636
[45] *July 8, 1975

[54] TAPE WRAPPING METHOD, APPARATUS, AND ARTICLE

[75] Inventors: Walter R. Wise, Pittsford; Nicholas L. A. Martucci, Rochester, both of N.Y.

[73] Assignee: Garlock Inc., Palmyra, N.Y.

[*] Notice: The portion of the term of this patent subsequent to Apr. 22, 1992, has been disclaimed.

[22] Filed: Jan. 17, 1973

[21] Appl. No.: 322,289

Related U.S. Application Data

[63] Continuation-in-part of Ser. No. 224,520, Feb. 8, 1972, abandoned.

[52] U.S. Cl............. 242/55; 242/67.3 R; 242/68.1
[51] Int. Cl............................................. B65h 75/02
[58] Field of Search............ 242/55, 67.1 R, 67.3 R, 242/68.1, 7.23, 67.5, 46.2; 156/187

[56] References Cited
UNITED STATES PATENTS

| 1,404,284 | 1/1922 | Fougrer | 242/67.5 |
| 3,320,342 | 5/1967 | Vinson | 156/187 |
| 3,761,038 | 9/1973 | Stauffer | 242/7.23 X |

*Primary Examiner*—Edward J. McCarthy
*Attorney, Agent, or Firm*—Schovee & Boston

[57] ABSTRACT

Tape, such as polytetrafluoroethylene tape, is wrapped onto a workpiece, such as the screw threads of a fitting, for fluid sealing purposes, by threading the tape from a tape roll to a tape reserve means (holding sufficient tape to wrap the fitting) and then to the fitting. The tape reserve means has less tape feed resistance than does the tape roll. To wrap the fitting, tape is fed by a primary tape feed means to the fitting from the tape reserve means, and tape is fed by a separate, secondary tape feed means from the tape roll to the tape reserve means to re-fill the reserve. In one embodiment, the secondary tape feed means includes: (1) an air-assist impulse turbine as part of the tape roll and (2) a primary inertial element in the tape reserve means. The turbine initiates tape roll rotation and the weight of the primary inertial element assists the air turbine to continue rotation of the tape roll. In another embodiment an electric motor gear drive is used in place of the air assist impulse turbine.

43 Claims, 10 Drawing Figures

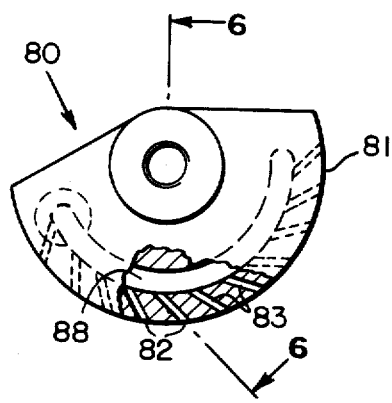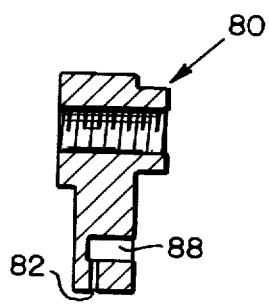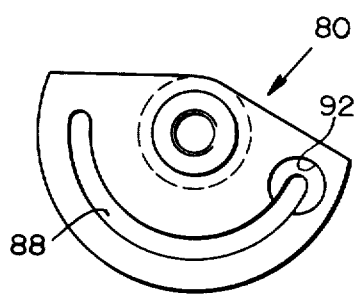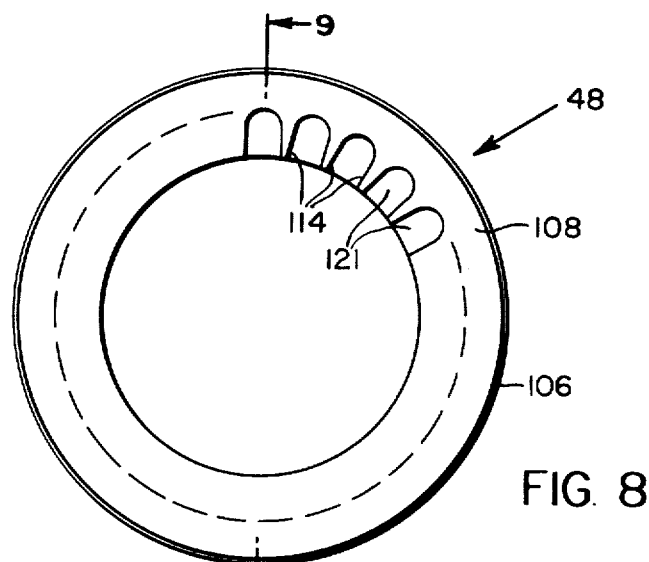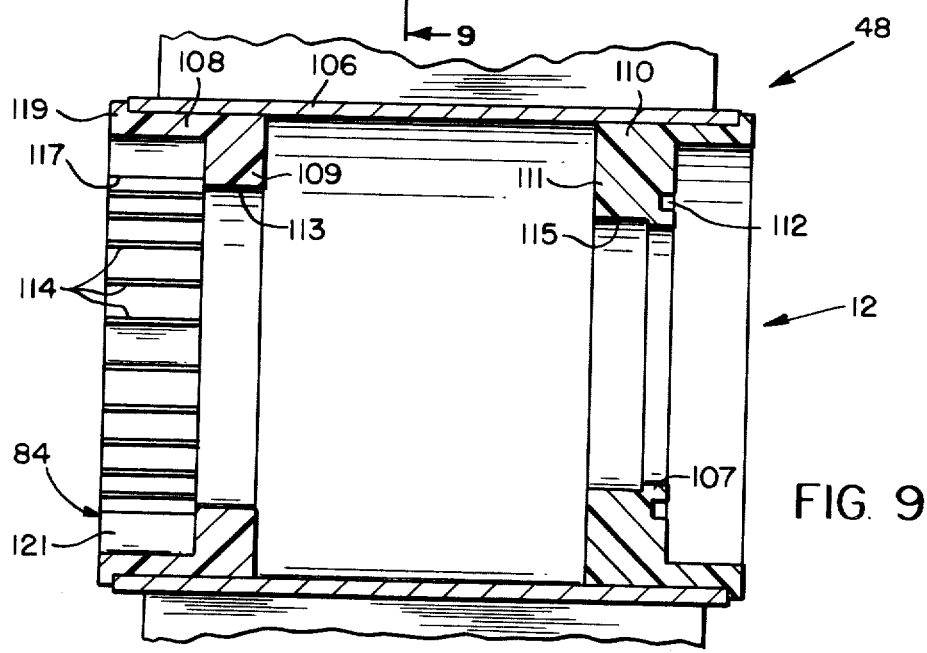

TAPE WRAPPING METHOD, APPARATUS, AND ARTICLE

CROSS REFERENCE TO RELATED APPLICATIONS

This is a continuation-in-part application of application Ser. No. 224,520, filed Feb. 8, 1972, and now abandoned and having the same title and inventors as the present application.

This invention is an improvement over the systems described in U.S. Pat. No. 3,320,342 and in U.S. Pat. No. 3,761,038; the disclosures in said U.S. Pat. are incorporated herein by reference.

BACKGROUND OF THE INVENTION

1. Field of the Invention

This invention relates to wrapping articles such as the screw threads of a fitting, with polytetrafluoroethylene tape, or the like, and in a preferred embodiment to an improved method, apparatus and article for wrapping such articles.

2. Description of the Prior Art

This invention is an improvement over, for example, the system described in U.S. Pat. No. 3,320,342. In that patent, the tape is fed directly from a tape roll to a fitting to be wrapped by means of a drive roller in driving engagement with the fitting. This known method is not satisfactory to feed from a large tape roll (such as a 1,000 yard roll), because the tape line drag, bearing friction, and the inertia of the tape roll (the term "tape feed resistance" is hereby defined for use in the present specification and claims to include all such factors), are too great for the drive roller to overcome without either excessively stretching the tape such that when cut the cut end will draw back too far to continue feeding properly, or without permanently deforming the tape.

It has been suggested to use air fan blades to rotate the tape roll to overcome its inertia, with a stationary air jet source and with air fan blades on one side of the reel. However, this was cumbersome and the protruding blades added undesirable thickness to the reel. It has also been suggested to place the air fan blades in the hub of the reel.

It is an object of this invention to provide specific tape wrapping systems that operate completely satisfactorily even with large tape rolls and without tape override.

It is another object of this invention to provide a tape wrapping system utilizing a tape reserve means positioned between (as viewed from the point of view of the tape train) the tape roll and the fitting, which tape reserve means presents relatively low tape feed resistance, whereby the tape can be fed easily and quickly from the tape reserve means to the fixture by a primary tape feed means such as a drive roller, and which system includes a secondary tape feed means including, in one embodiment, an air-assist impulse turbine for feeding the tape (without tape override) from the tape roll to the tape reserve means (usually simultaneously with the primary tape feed means – although it starts after the primary means starts). In another embodiment the secondary tape feed means is an electric motor gear drive. The secondary feed means is capable of operating against the relatively greater tape feed resistance of the tape roll.

It is another object of this invention to provide a tape roll core, and a tape roll including the core on which it is wound, the core being at least partially hollow and having, in one embodiment, an air-assist impulse turbine wheel formed as an integral part thereof, and another embodiment having gear teeth integral therewith. The core forms an integral part of the secondary tape feed system.

SUMMARY OF THE INVENTION

A method, apparatus, and article for wrapping polytetrafluoroethylene tape onto the screw threads of a fitting for fluid sealing purposes. Instead of feeding the tape by means of a drive roller engaging the fitting directly from a tape roll to the fitting, the tape is threaded from the roll to a tape reserve means and then to the fitting. The fitting is wrapped by feeding tape to the fitting from the reserve in the tape reserve means, by a primary feeding means, and feeding the tape from the tape roll to the tape reserve means by a separate, secondary feeding means. The primary tape feed means can be the same drive roller as used in the prior art direct feeding. The secondary feeding means includes, in one embodiment: (1) an air-assist impulse turbine for rotating the tape roll, with the tape roll core including a turbine wheel, and (2) a primary inertial element in the tape reserve means, the inertia of which provides part of the tape feed resistance of the tape reserve means, (the rest being friction, drag, etc.) and the weight of which aids or assists the turbine to feed tape from the tape roll to the tape reserve means. In another embodiment an electric motor gear drive is used in place of the air-assist impulse turbine.

BRIEF DESCRIPTION OF THE DRAWINGS

The present invention will be more fully understood by reference to the following detailed description thereof, when read in conjunction with the attached drawings wherein like reference numerals refer to like elements, and wherein:

FIGS. 5, 6, and 7 are views of the air jet manifold 80, FIG. 5 being a front plan view, FIG. 6 being a cross-sectional side view, and FIG. 7 being a rear plan view;

FIGS. 8 and 9 are enlarged views of the tape core 48, FIG. 8 being a rear plan view, and FIG. 9 being a side cross-sectional view.

DETAILED DESCRIPTION OF THE PREFERRED EMBODIMENTS

Figure 1:
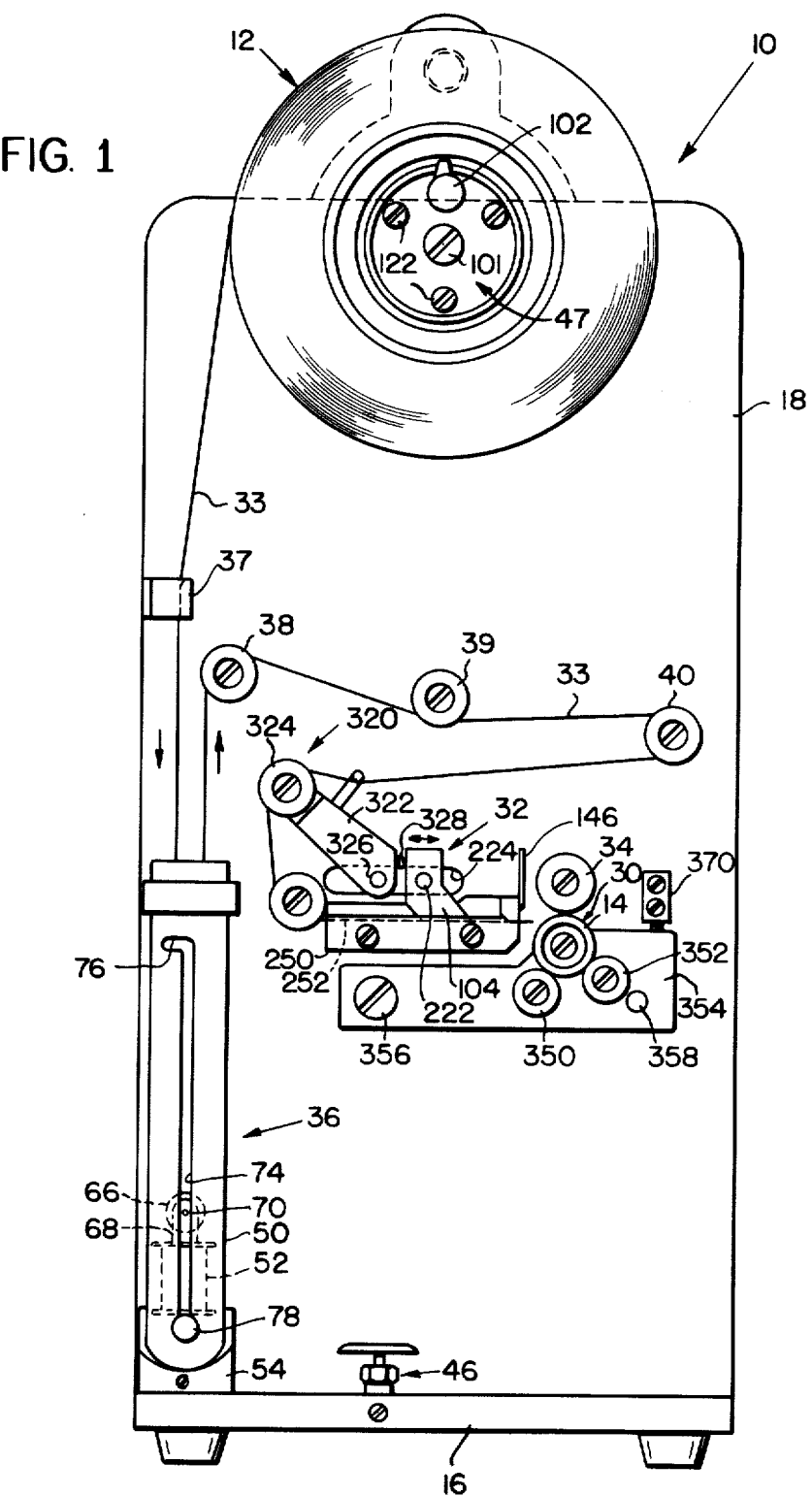
FIG. 1 is a front plan view of the apparatus of the present invention.
Figure 2:
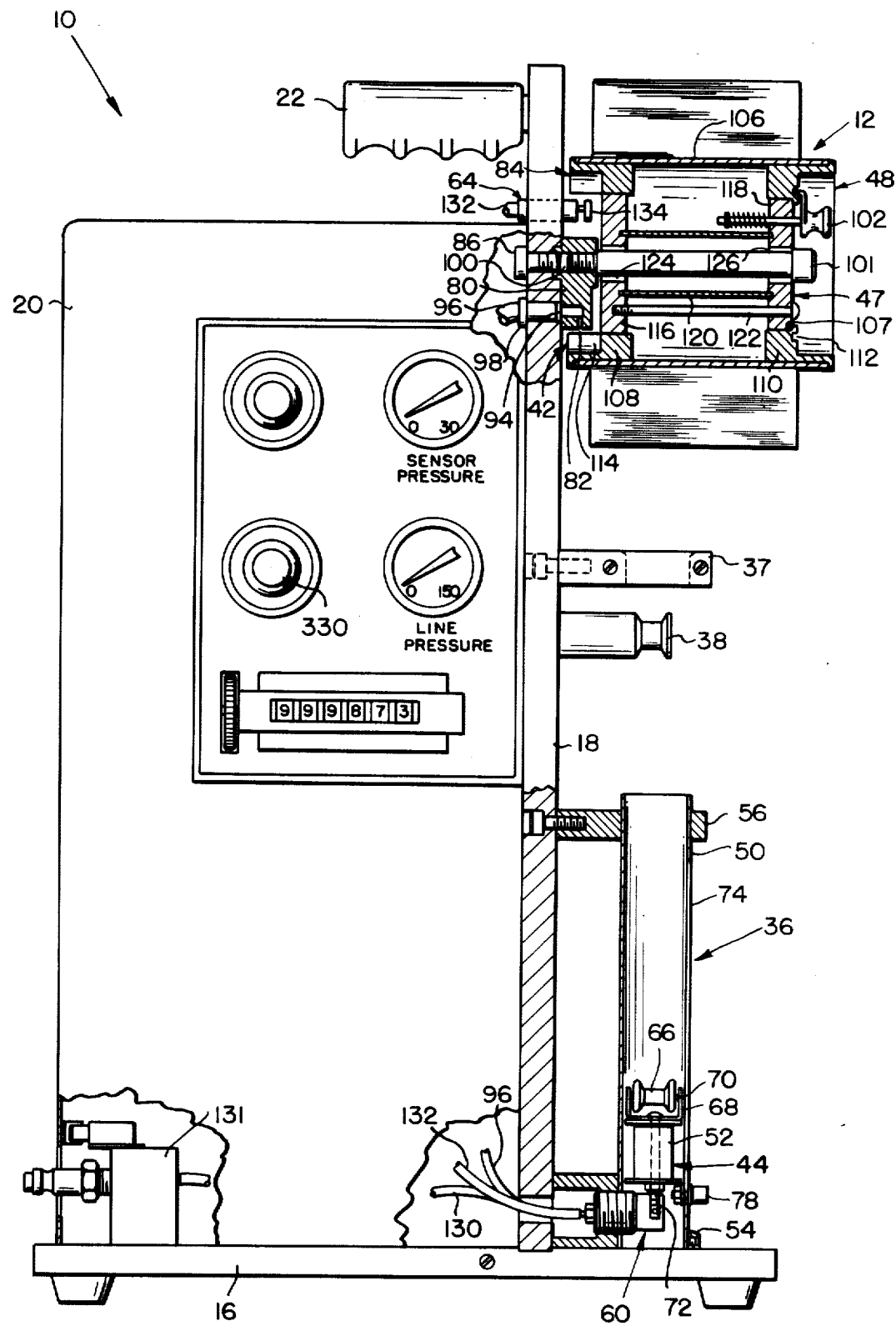
FIG. 2 is a partial cross-sectional, partial plan, side view of the apparatus of FIG. 1.

With reference now to the drawings, FIGS. 1 and 2 illustrate the basic features of the pneumatically operated tape wrapping machine 10 of the present invention which accepts a tape roll, such as a 1,000 yard tape roll 12, for tape wrapping a workpiece, such as the screw threads of a fitting 14. The machine 10 includes a base plate 16, a front mounting plate 18, a housing cover 20, and a handle 22.

Referring to FIGS. 1 and 2, the various operative parts or stations of the machine 10 are: I - a workpiece (fitting 14) holder 30; II - a finger assembly 32 for pushing the tape 33 into locking engagement inbetween the fitting 14 and a drive roller 23; III - a tape reserve means 36 for providing a supply or reserve of tape (which reserve presents relatively low tape feed resistance as compared to that of the tape roll 12) from which tape can be easily and quickly fed by power roller 34, upon demand, directly to the fitting 14; IV - a primary tape feeding means (comprising the drive roller 34) for feeding tape from the tape reserve means 36 to the fitting 14; and V - a secondary tape feeding means for feeding tape from the roll 12 to the tape reserve means 36 [the secondary tape feeding means comprises an air-assist impulse turbine 42 (see FIG. 2) and a primary inertial element (comprising a piston 52) in the tape reserve means 36].

Before describing the above-listed parts or stations in detail, the manner in which the tape 33 is threaded through the machine 10 will now be briefly described. The tape roll 12 is mounted on a spindle 47 and the tape 33 is threaded through a tape funnel guide 37, into and out of the tape reserve means 36, around the three tape rollers 38, 39, and 40, and then to the finger assembly 32. After the fitting 14 is inserted in place and a start poppet 46 pushed, the finger assembly 32 pushes tape 33 in-between the fitting 14 and the drive roller 34, the drive roller 34 then pulls tape out of the tape reserve means 36 and wraps it onto the fitting 14, while the secondary tape feed means feeds tape from the tape roll 12 to the tape reserve means 36 to re-fill it for use in wrapping the next subsequent fitting.

The above listed parts of the present invention will now be discussed in detail in same order as listed above.

I The Workpiece Holder 30

Figure 3:
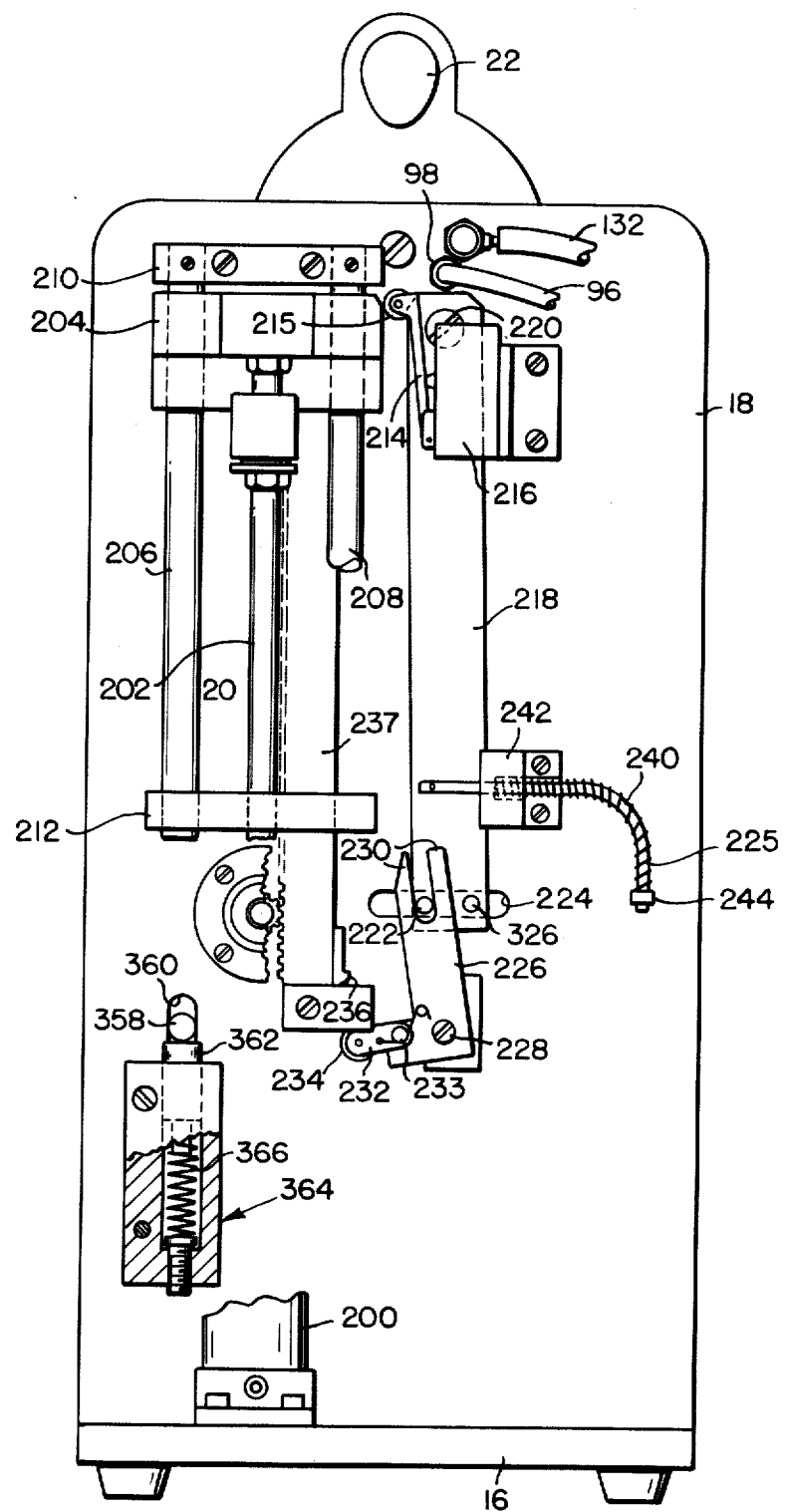
FIG. 3 is a partly cut-away, rear view of the apparatus of FIG. 1 with the cover 20 off.
Figure 4:
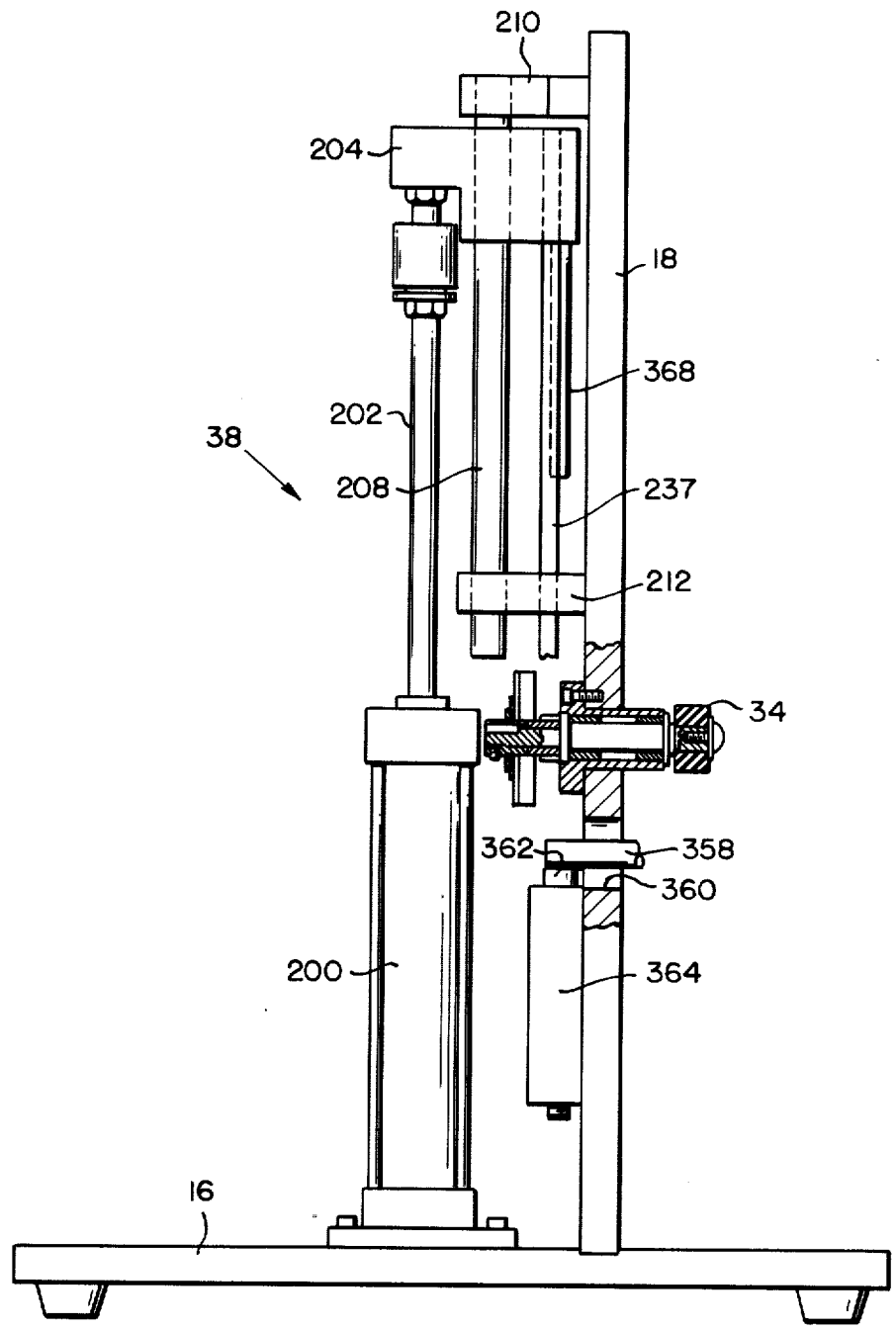
FIG. 4 is a partial, side cross-sectional view of the apparatus of FIG. 1.

Referring to FIGS. 1, 3, and 4, the workpiece holder 30 comprises basically a pair of rotatable rollers 350 and 352, rotatably mounted on a pivot plate 354, pivotally connected to the front mounting plate 18 by means of a pivot pin 356. A shaft 358 is connected to the pivot plate 354 and extends from the rear of the pivot plate 354 through a vertical slot 360 in the mounting plate 18 into position above a plunger 362 of a spring box 364 including a compression spring 366 for upwardly biasing the plunger 362. A depressing rod 368 is mounted on the slide block assembly 204, in line with the plunger 362 and above the shaft 358. When the piston rod 202 is down (FIG. 3), the depressing rod 368 pushes the shaft 358 down, thus pivoting the pivot plate 354 clockwise as viewed in FIG. 1, to provide sufficient clearance between the drive roller 14 and the rollers 350 and 352, to allow a fitting 14 to be easily placed into position on top of the rollers 350 and 352. When the start poppet 46 is pushed, the piston rod 202 rises, along with the depressing rod 368, allowing the plunger 362 to push the shaft 358 up, pivoting the pivot plate 354 counterclockwise (as viewed in FIG. 1) thus forcing the fitting 14 into driving engagement with the drive roller 34. Similarly, after wrapping of the fitting 14 is completed, the pivot plate is lowered allowing easy removal of the wrapped fitting 14. An adjustable stop 37 is mounted on plate 18 above the pivot plate 354. The pivot plate 354 is shown in FIG. 1 in its up or closed position for holding and wrapping a fitting 14.

II The Finger Assembly 32

Referring to FIGS. 1, 3, and 4, the finger assembly 32 includes a tape feed-block 250 having a groove 252 in its upper surface through which the tape 33 passes on its way to the fitting 14. A finger 104 is mounted for back and forth sliding movement in the groove 252, and may have a serrated bottom for pushing the tape 33 to locking engagement inbetween the fitting 14 and the rotating drive roller 34. The drive roller 34 then takes over the feeding of the tape 33 to the fitting 14 and the finger 104 slides over the tape 33 and back to the left (as viewed in FIG. 1) in preparation for feeding tape to the next fitting to be wrapped.

In addition to the above-described structure, the present invention employs a bobbin assembly 320 (see FIG. 1), described in said U.S. Pat. Application Ser. No. 129,472, filed Mar. 30, 1971, now U.S. Pat. No. 3,761,038 and incorporated herein by reference. The bobbin assembly 320 includes a support 322 and an idler roller 324 rotatably mounted on the support 322. The bobbin assembly 320 is rigidly connected to a shaft or pin 326, and the finger 104 is pivotally connected to a pin 222, which pins 326 and 222 extend through a slot 224 in the plate 18 and are rigidly connected to a slide arm 218 (see FIG. 3). A small compression spring 328 is positioned between the support 322 and the finger 104, to spring bias the finger 104 (clockwise as viewed in FIG. 1 about its pivot pin 222) into contact with the tape 33 in the groove 252.

As the finger 104 moves to the right as viewed in FIG. 1 to feed the tape 33 to the fitting 14, the simultaneous movement to the right therewith of the bobbin assembly 320, releases tension on the tape 33, to aid the finger 104 in feeding the tape 33 to the fitting 14 without the need for withdrawing any tape from the tape reserve means 36.

After the tape 33 is fed to the fitting 14 by the finger 104, the finger 104 then slides to the left (as viewed in FIG. 1) over the tape 33. The finger 104 can minutely pivot in a counterclockwise direction (as viewed in FIG. 1), against the force of the small spring 328.

Referring now to FIGS. 3 and 4, an air cylinder 200 is mounted on the base plate 16 for vertically reciprocatingly moving a piston rod 202 and a slide block assembly 204. A pair of vertical guide posts 206 and 208 are connected to the mounting plate 18 by means of a pair of guide post brackets 210 and 212. The piston rod 202 always starts in its lower position and begins to move upwardly when the start poppet 46 is depressed. The piston rod 202 then reverses direction and moves downwardly when a switch arm 214 and roller 215 closes a switch 216, by the arm 214 being moved to the right (as viewed in FIG. 3) when the roller 215 is contacted by the slide block assembly 204. The piston rod 202 stops its downward movement when depressing rod 368 (FIG. 4) hits the shaft 358. At this point a pneumatic four-way valve (not shown) has equal pressure in all four lines. The art poppet 46 takes pressure off of one side and starts the piston moving and the switch 216 turns the four-way valve and reverses the pressure to reverse movement. Known valves such as made by Aro Corp. can be used, as will be understood by any one skilled in the art. The means for moving the finger 104 of the finger assembly 32 to the right (as viewed in FIG. 1) include an elongated slide arm 218 pivotally connected to the plate 18 at 220, and a shaft 222 connecting the lower end of the slide arm 218 to the finger 104 and extending through the slot 224 in the front mounting plate 18. A compression spring 225 maintains the finger 104 in its leftmost position (as viewed in FIG. 1), except when the finger 104 is moved to the right as described immediately below.

The spring 225 is fitted over a rod 240 between a block 242 mounted on the plate 18 and a collar 244 connected to one end of the rod 240. The other end of the rod 240 slides through the block 242 and is connected to the slide arm 218.

A slide yoke 226 is mounted on plate 18 at a pivot connection 228 and includes bifurcated arms 230 encompassing the pin 222 therebetween. The slide yoke 226 includes a yoke flipper 232 pivotally connected thereto at 233 and having a yoke roller 234 attached to the terminal end thereof. The yoke flipper 232 is spring biased to its position shown in FIG. 3. The flipper 232 can "flip" or rotate clockwise as shown in FIG. 3 without causing the slide yoke 226 to move. However, when the flipper 232 is forced counterclockwise (as viewed in FIG. 3) by a cam 236, the slide yoke 226 is caused to pivot counterclockwise (as viewed in FIG. 3), thus forcing the pin 222 and the finger 104 to the left (or to the right as viewed in FIG. 1) to feed tape 33 to the fitting 14. The cam 236 is mounted on a gear rack 237 connected to the slide block assembly 204, for actuating the flipper 232 and in turn the slide yoke 226 and finger 104, during the first part of the downward travel of the piston rod 202.

A gear rack 237 is connected to the slide block assembly for rotating the drive roller 34, and means for actuating the knife 146 are connected to slide bar assembly 204 essentially as described in U.S. Pat. No. 3,320,342, incorporated herein by reference.

III The Tape Reserve Means 36

Referring to FIGS. 1 and 2, the tape reserve means 36 comprises a cylindrical tube 50 in which a piston 52 is positioned for vertical reciprocating movement. The tube 50 is mounted on the base plate 16 by means of a bracket 54 and is maintained vertical by a bracket 56 connected to the front plate 18. A sensor 60(such as an interruptable jet sensor made by Norgren Company) is located at the bottom of the tube 50 and includes a switch for controlling the flow of air to the air-assist impulse turbine 42 and to a brake 64, as will be described in more detail below.

The top of the piston 52 is fitted with a roller 66 by means of a spring clip bracket 68 connected to the piston 52 and an axle pin 70 (on which the roller 66 is freely rotatably mounted) extending through an axial bore in the piston 52 and extending between holes in opposing legs of the bracket 68. The axle pin 70 has shoulders (not shown) at each end to keep the legs of the bracket 68 away from the roller 66. The bottom of the piston 52 is provided with an extension 72 that extends into and is sensed by the sensor 60. When the piston 52 is at the bottom of the tube 50 (it may if desired rest on the sensor 60), the air lines controlled by the switch in the sensor 60 are closed. Once the extension 72 of the piston 52 is lifted out of the sensor 60, by the drive roller 34 calling for tape from the tape reserve means 36, the switch in the sensor 60 simultaneously opens the air lines to the turbine 42 and to the brake 64 (described below in Section V).

The tube 50 constrains lateral motion of the piston 52, but permits axial (which is vertical motion in the preferred embodiment shown) and rotational motion. The tube 50 has a vertical slot 74 (having a horizontal upper section 76) through which a lock 78 slidably extends for raising the piston 52 up to a position such that the roller 66 is above the top of the tube 50 to facilitate threading of the tape 33 through the roller-fitted piston 52.

Both the mass and the weight of the roller-fitted piston 52 are functional. The piston 52 (and more particularly the mass thereof) constitutes the primary inertial element, the inertia of which must be overcome when the machine 10 suddenly calls for tape 33. The weight of the piston 52 aids the air-assist impulse turbine 42 in rotating the tape roll 12 to feed tape to the tape reserve means 36. The linear inertia of the primary inertial element 52 is, of course, much less than that of the combined rotary inertia of the secondary inertial element (comprising the spindle 47 and the tape roll 12 including a core 48 and, for example, a 1000 yards length of tape wound thereon, all of which together may weigh several pounds). The weight of the primary inertial element (the piston 52) is preferably of the order of several ounces. The height of the tube 50 is designed such that the piston 52 never reaches the top of the tube 50 during wrapping.

IV The Primary Tape Feed Means

The primary tape feed means is the drive roller 34, and this is fully described in U.S. Pat. No. 3,320,342 (see, for example, FIG. 5 thereof showing the gear rack 36), and such means need not, therefore, be described in detail here. Once the finger assembly 32 has pushed the tape 33 in-between the drive roller 34 and the fitting 14, the drive roller 34 takes over and pulls the necessary amount of tape 33 from the tape reserve means 36, against the relatively low inertia or "tape feed resistance" of the piston 52 therein.

V The Secondary Tape Feed Means

Referring to FIGS. 1 and 2, and 5-9 the secondary tape feed means comprises the air-assist impulse turbine 42 and the primary inertial element (the piston 52), for rotating the tape roll 12 to feed tape into the reserve tube 50, as it is or after it has been withdrawn from the tape reserve means 36 by drive roller 34 for wrapping a fitting 14 (except possibly for a very small fitting 14, the secondary tape feed means is operating simultaneously with the drive roller 34).

The turbine 42 includes an air jet manifold block 80 (see FIGS. 2, and 5-7) having air-jet ports 82 and passageways 83 for directing air toward a vaned or bladed turbine wheel 84 (see FIGS. 2, 8 and 9) for rotating the turbine wheel 84. The inside diameter of the turbine wheel 84 is slightly greater (for example, preferably by about ⅛ inch) than the outside diameter of the manifold block 80.

The manifold block 80 is mounted on the front of the plate 18 by means of a socket head cap screw 86. FIGS. 5–7 show the semi-circular manifold block 80 having a semi-circular internal manifold chamber 88 communicating with a plurality of circumferentially evenly spaced-apart air-jet ports 82 by means of a plurality of passageways 83. The passageways 83 are preferably at an angle of about 45° to a radial from the center of the block 80. The block 80 includes a larger bore 92 communicating with the chamber 88, with a hole 94 through the plate 18, and with an air tube 96 connected by a suitable fitting 98 to the plate 18 at the hole 94. The manifold block 80 also includes an internally threaded bore 100 for mounting the spindle 47 to the block 80 by a screw 101.

Regarding now the turbine wheel 42, it forms an integral part of the overall structure of the tape roll 12. The tape roll 12 includes a length of tape 33 wrapped onto the core 48. The tape roll 12 is mounted on the machine 10 by sliding the bore 48 over the spindle 47 and locking the tape roll 12 thereto by means of a latch means 102.

The core 48 portion of the tape roll 12 comprises basically a cylinder on which the tape is to be wound and an impulse turbine wheel. Specifically, the core 48 comprises a hollow, cylindrical tube or spool 106, on which the tape 33 is wound, and two hollow, cylindrical or ring-shaped hubs 108 and 110 integral with the spool 106 preferably by being permanently connected to the tube 106 at the ends thereof. Each of the hubs 108 and 110 have an innermost section (109 and 111, respectively) having an internal cylindrical surface (113 and 115 respectively) that provides a close sliding fit over the hubs 116 and 118 respectively, of the spindle 47. The outer ring 110 includes a recess, preferably an annular groove 112 on its outer radial face for receiving the latch 102 for holding the tape roll 12 onto the spindle 47 of the machine 10, and also includes a shoulder 107 to properly axially position the roll 12 on the spindle 47, with the turbine wheel 84 of the inner hub 108 in direct, radially, spaced-apart, overlying relation to the outer semi-cylindrical surface 81 of the manifold 80. The inner hub 108 includes the turbine wheel 84 as a part thereof (see FIGS. 8 and 9) and includes a plurality of equally circumferentially spaced-apart, radially extending air fan blades 114, each preferably positioned in a plane parallel to and passing through the axis of the core 48. The blades 114 extend radially from an inside surface 117 of the hub 108 only partway through the hub 108, such that the spaces or grooves 121 defined therebetween have a depth less than the thickness of the hub. The blades 114 extend axially (or longitudinally) from the inner surface 119 of the hub 108 only partway through the hub 108, such that the grooves 121 between the blades 114 are enclosed on two sides (i.e. on the radial and axial outside sides thereof). When the tape roll 12 is mounted on the spindle 47, and jets of air are impinged upon or directed against the blades 114, the tape roll 12 is caused initially to rotate by the force of the air jets against the blades.

The principal feature of the air-assist, impulse turbine 42 is that, when activated (compressed air discharges from the nozzle block or manifold 80 and impinges upon the vanes or blades 114 of the turbine), an impulsive force is generated whereupon the tape roll 12 is given a slight rotary motion. Immediately following the impulse, the air-assist system may continue to call for air, but the steady-state efficiency of the turbine 42 is such that its assistance in continuing to rotate the roll is significantly reduced. This characteristic of the turbine helps to prevent override of the tape roll 12 and consequent fouling of the tape train. The impulse of the turbine 42 acts in consonance with the weighted piston 52 in continued feeding of the tape called for, until the tape reserve means 36 is re-filled.

The line pressure is preferably adjusted (by means of knob 330 - see FIG. 2) such that the impulse force is sufficient to initiate rotation of the tape roll 12 and the steady state or sustaining force is not sufficient in and of itself to sustain rotation of the tape roll 12 after it has been initiated. The steady-state force plus the weight of the piston 52 is sufficient to sustain rotation of the tape roll 12.

Referring now to FIG. 2, the spindle 47 includes a pair of end hubs 116 and 118 held spaced apart by a hollow cylindrical spacer 120, and connected together by a plurality of screws 122. The spring biased core latch means 102 is connected to the hub 118 as shown in FIG. 2. Each of the hubs 116 and 118 has a bearing 124 and 126 press-fitted therein for rotatably mounting the spindle 47 on the screw 101 connected to the manifold block 80.

The secondary tape feed means includes the abovedescribed air-assist impulse turbine 42, for starting the tape roll 12 rotating, and also includes the primary inertial element of the piston 52, the weight of which piston 52 causes the rotating tape roll 12 to keep rotating until the piston 52 descends to the bottom of the tube 50 and the extension 72 is sensed by the sensor 60. The sensor 60 then switches off air to the turbine 42. The sensor 60 is connected to an air inlet tube 130 coming from an air line anchor block 131. The sensor 60 is connected to an air tube 96 for feeding air to the turbine 42 and also to an air tube 132 connected to the brake 64. The sensor 60 includes a switching means, for opening and closing communication between air inlet line 130 and the two air lines 96 and 132, as well as a sensing means that senses the presence of the extension 72 of piston 52 for operating the switch.

The spring-loaded brake 64 (see FIG. 2) associated with the secondary feeding means will now be described. The brake 64 is mounted on the front plate 18 just above the manifold block 80 (in the cut-out portion thereof - within the circular "envelope" of the manifold block 80), whereby a brake shoe 134 can move forward into contact with the hub 116 of the spindle 47 to stop rotation of the tape roll 12. The brake shoe 134 is spring-biased into contact with the hub 116 preventing rotation thereof. However, when the extension 72 lifts out of the sensor 60, air is fed to the brake 64 forcing the brake shoe 134 back out of contact with the hub 116, against the force of the spring, to allow rotation of the tape roll 12.

OPERATION

The sequence of events relating to the operation of the present invention and of the primary inertial element 52 and the secondary inertial elements (roll 12 and spindle 47) and the air-assist turbine 42 is as follows:

1. Upon insertion on the workholder 30 of a fitting 14 to be wrapped, and actuation of the start poppet 46, the tape 33 is advanced by the finger 104 to the mating surfaces between the drive roller 34 and the fitting 14. Up to this point, no advancement of tape from the reserve in tube 50 or from the supply roll 12 is required.

2. Upon tape feeding rotation of the drive roller 34, tape 33 is requisitioned from the tape reserve in tube 50, whereupon the primary inertial element 52 ascends, fluidic sensor 60 is activated, and line-pressure air releases the spring-loaded brake 64 and simultaneously air jets impinge upon the blades 114 of the impulse turbine wheel 84 to initiate rotation of the tape roll 12.

3. The steady state action of the turbine 42 along with the weight of the primary inertial element 52 are sufficient to sustain rotation of the tape roll 12.

4. Upon rotation of the tape roll 12 and the consequent unwinding of tape 33 therefrom, the weight 52 descends to the bottom of the tube 50 where it is sensed by the sensor 60 which then simultaneously shuts off air to the turbine 42 and to the brake 64; the brake 64 being automatically reapplied. This completes the wrapping sequence, and the wrapped fitting 14 may then be removed and another fitting inserted.

Figure 10:
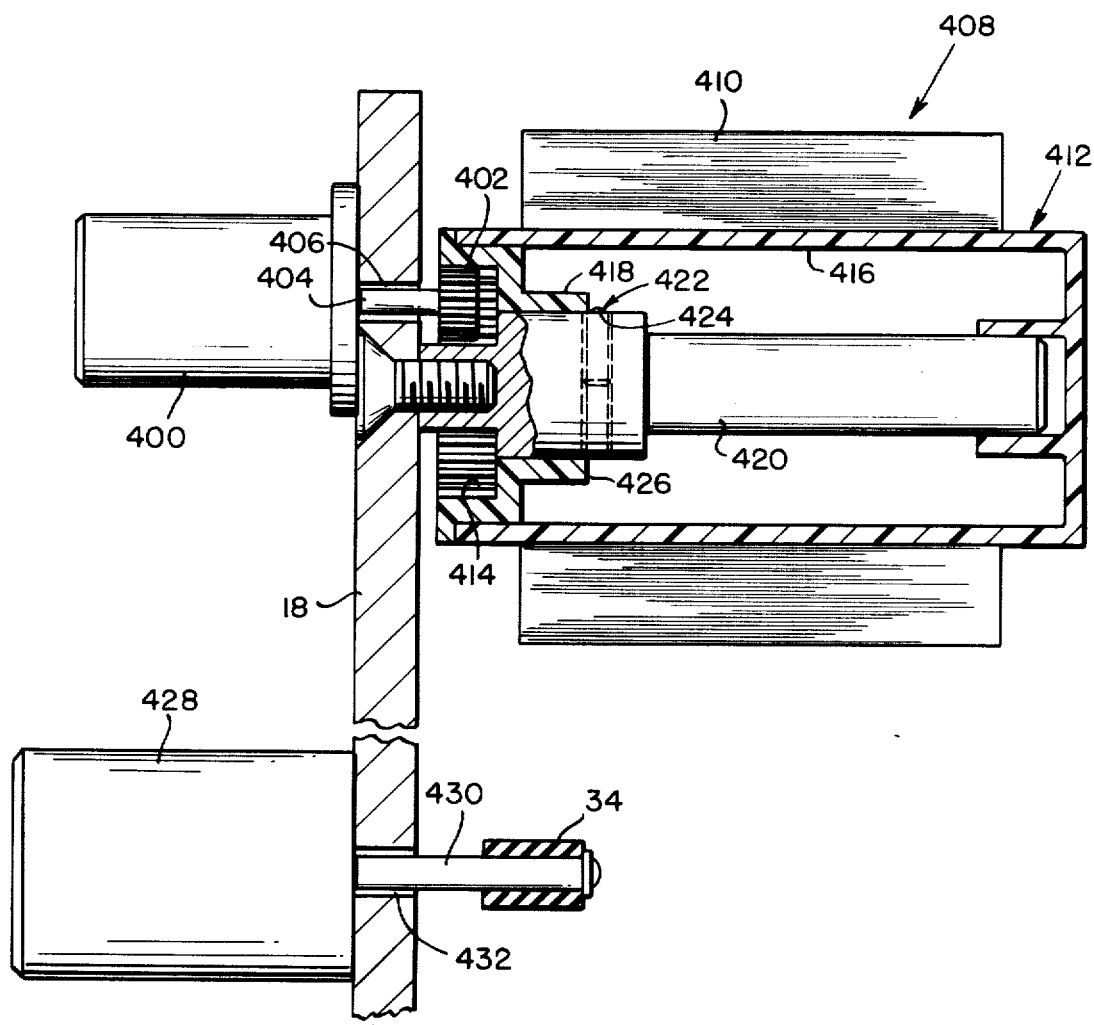
FIG. 10 is a partial cross-sectional partly schematic, side view of one embodiment of the present invention.

Reference will now be made to another embodiment of the present invention, shown in FIG. 10. This embodiment employs an electric motor gear drive system in place of the air-assist impulse turbine described above with respect to FIGS. 1–9.

According to this embodiment, an electric motor 400 is mounted on and behind the front mounting plate 18 and is connected to a drive gear 402 by means of a drive shaft 404 extending through a larger opening 406 in the mounting plate 18. The tape roll 408 includes a length of tape 410 wrapped on a core 412. The core 412 is similar to the core 48 described in FIGS. 1–9, except that instead of having a turbine wheel 84 integral therewith, the core 412 has gear teeth 414 integral therewith. The drive gear 402 is located so as to be in meshing engagement with the gear teeth 414 of the core 412.

The core 412 can be made as a two-piece molded plastic article, including a spool portion 416 and a gear teeth hub 418 connected to the spool portion 416. The core 412 fits on and rotates with respect to a stationary spindle 420 as shown in FIG. 10. The spindle 420 can include a spring biased ball plunger lock 422 for removably holding the core 412 onto the spindle, by the ball 424 engaging an inner edge 426 of the hub 418.

When using this embodiment for the secondary tape feed means, the entire apparatus can be made electric rather than pneumatic by using a second electric motor 428 as the primary tape feed means to drive the drive roller 34. The second electric motor 428 is connected to the front mounting plate 18 and is connected to the drive roller 34 by a drive shaft 430 extending through an opening 432 in the mounting plate 18. Thus, one aspect of this embodiment is the use of two electric motors, one to feed tape to a fitting and one to rotate the tape roll.

The above detailed description is that of the presently preferred mode of the present invention, however, various modifications can be made therein. For example, the primary inertial element 52 can be replaced with, for example, a spring system, which would present relatively little tape feed drag or resistance to the drive roller 34 (as compared to the relatively greater tape feed resistance that would be presented by the large tape roll 12 itself), and the expanded spring would then aid continued rotation of the tape roll 12 (for re-filling the tape reserve means 36) after the initial rotation given to it by the air-assist impulse turbine 42. Other size rolls (larger and smaller) can be used than the 1000 yard tape roll of the described example. The weight of the primary inertial element (piston 52) can be easily changed by adding weight thereto or removing weight therefrom (such as by use of a stack of washers for the weight). The machine 10 can be modified to operate in positions other than the normal upright mode shown in the drawings, and the axis of the fitting can be at any orientation, such as vertical instead of horizontal. The tape reserve need not be in a tube, and it need not be vertical. Other turbine means can be used in place of the preferred turbine 42. For example, other shapes and types of blades can be used on the core 48; they can be inside the core 48 as shown or can project outwardly therefrom, if desired. Also the air can come into the core and exit from the core, if desired, to cause rotation thereof. The passageways 83 and blades 114 can be at other angles than those shown in the drawing of the preferred embodiment. The present invention can alternatively use the improvement (relating to reducing the length of the stroke of the gear rack) described in U.S. Ser. No. 129,472, filed Mar. 30, 1971 by DuWayne W. Stauffer, for Tape-Wrapping Method and Apparatus. This invention can also be useful in wrapping other threaded or unthreaded pieces such as screws, bolts, rods, etc. for purposes other than or in addition to fluid sealing.

The invention has been described in detail with particular reference to the preferred embodiment thereof, but it will be understood that variations and modifications can be effected within the spirit and scope of the invention as described thereinabove and as defined in the appended claims.

I claim:

1. A method for feeding tape from a tape roll to a work-piece to be wrapped with a length of the tape, said method comprising:
   a. feeding tape to a workpiece by a primary tape feed means; and
   b. initiating rotation of the tape roll by means of an air impulse turbine separate from said primary tape feed means for feeding tape from said roll.

2. The method according to claim 1 wherein said step of initiating rotation of said tape roll includes impinging a jet of air from a stationary air jet manifold upon air fan blades rotatable with said tape roll.

3. A method for feeding tape from a tape roll to a workpiece to be wrapped with a length of the tape, said method comprising:
   a. feeding tape to a workpiece by a primary tape feed means; and
   b. initiating rotation of the tape roll by means of an air impulse turbine for feeding tape from said roll, said step of initiating rotation of said tape roll including impinging a jet of air from a stationary air jet manifold upon air fan blades rotatable with said tape roll, and said impinging step comprising generating an impulse force and a steady state force, said impulse force being sufficient to overcome tape feed resistance of said roll and initiate rotation thereof and said steady state force being less than said impulse force and also being less than the force necessary to produce sustained rotation of said tape roll, for preventing tape override.

4. The method according to claim 2 wherein said air fan blades are integral with a spool upon which said tape is wound.

5. The method according to claim 2 including feeding said tape from said tape roll to an intermediate tape reserve means and feeding tape from said tape reserve means to said workpiece, and providing said tape reserve means with a tape feed resistance less than that of said tape roll.

6. The method according to claim 5 including continuing the initiated rotation of said tape roll until the tape reserve means is refilled.

7. A method for feeding tape from a tape roll to a workpiece to be wrapped with a length of the tape, said method comprising:
   a. feeding tape to a workpiece by a primary tape feed means;
   b. initiating rotation of the tape roll by means of an air impulse turbine for feeding tape from said roll, and employing for said tape roll a length of tape wound upon a core having air fan blades integral therewith, and wherein said step of initiating rotation of said tape roll comprises impinging a jet of air upon said blades.

8. A method for feeding tape from a tape roll to a workpiece to be wrapped with a length of the tape, said method comprising:
   a. feeding tape to a workpiece by a primary tape feed means comprising rotating a drive roller in driving engagement with said workpiece; and
   b. initiating rotation of the tape roll by means of an air impulse turbine for feeding tape from said roll.

9. A method for feeding tape from a tape roll to a workpiece to be wrapped with a length of the tape by a primary tape feed means, said method comprising:
   a. providing a tape reserve means, threading said tape from said tape roll to said tape reserve means and then to said workpiece, said tape reserve means holding a quantity of tape and providing said tape reserve means with a lower tape feed resistance than that of said tape roll;
   b. feeding tape, by said primary tape feed means, from said tape reserve means to said workpiece and wrapping said tape onto said workpiece; and
   c. feeding tape, by a secondary tape feed means separate from said primary tape feed means, from said tape roll to said tape reserve means to re-fill said tape reserve means, said step of feeding tape by said secondary tape feed means comprising providing said tape roll as a length of tape wound upon a core having a turbine wheel including a plurality of air fan blades integral therewith, mounting said core on a rotatable spindle adjacent an air jet manifold having at least a semi-circular periphery concentric with the axis of said spindle, and directing an air jet from said manifold against said blades for initiating rotation of said tape roll.

10. The method according to claim 9 including directing said air jet against said blades in a plane substantially perpendicular to the axis of rotation of said spindle.

11. A method for feeding tape from a tape roll to a workpiece to be wrapped with a length of the tape by a primary tape feed means, said method comprising:
   a. providing a tape reserve means, threading said tape from said tape roll to said tape reserve means and then to said workpiece, said tape reserve means holding a quantity of tape and providing said tape reserve means with a lower tape feed resistance than that of said tape roll;
   b. feeding tape, by said primary tape feed means, from said tape reserve means to said workpiece and wrapping said tape onto said workpiece; and
   c. feeding tape, by a secondary tape feed means separate from said primary tape feed means, from said tape roll to said tape reserve means to refill said tape reserve means, said step of feeding tape by said secondary tape feed means comprising providing said tape roll as a length of tape wound upon a core having a turbine wheel including a plurality of air fan blades integral therewith, mounting said core on a rotatable spindle adjacent an air jet manifold having at least a semi-circular periphery concentric with the axis of said spindle, directing an air jet from said manifold against said blades for initiating rotation of said tape roll, and enclosing the spaces between said blades on at least two sides thereof.

12. A method for feeding tape from a tape roll to a workpiece to be wrapped with a length of the tape by a primary tape feed means, said method comprising:
   a. providing a tape reserve means, threading said tape from said tape roll to said tape reserve means and then to said workpiece, said tape reserve means holding a quantity of tape and providing said tape reserve means with a lower tape feed resistance than that of said tape roll;
   b. feeding tape, by said primary tape feed means, from said tape reserve means to said workpiece and wrapping said tape onto said workpiece; and
   c. feeding tape, by a secondary tape feed means separate from said primary tape feed means, from said tape roll to said tape reserve means to refill said tape reserve means, said step of feeding tape by said secondary tape feed means comprising providing said tape roll as a length of tape wound upon a core having a turbine wheel including a plurality of air fan blades integral therewith, mounting said core on a rotatable spindle adjacent an air jet manifold having at least a semi-circular periphery concentric with the axis of said spindle, directing an air jet from said manifold against said blades for initiating rotation of said tape roll, providing said manifold with a semi-circular periphery having a plurality of air jet ports and having a specific outside diameter, providing said turbine wheel with a circular internal diameter slightly greater than the outside diameter of said manifold, and positioning said core such that said turbine wheel directly overlies said manifold air jet ports.

13. The method according to claim 12 including directing said air jets at said blades at an angle of about 45° to a radial from the center of said manifold.

14. The method according to claim 12 wherein said directing step comprises generating an impulse force and a steady state force, said impulse force being sufficient to overcome tape feed resistance of said roll and initiate rotation thereof and said steady state force being less than said impulse force and also being less than the force necessary to produce sustained rotation of said tape roll, for preventing tape override.

15. The method according to claim 14 including directing said air jets at said blades at an angle of about 45° to a radial from the center of said manifold.

16. The method according to claim 15 including wrapping a length of said tape onto said workpiece.

17. The method according to claim 16 wherein said workpiece is a fitting having screw threads to be wrapped, and said tape is polytetrafluoroethylene.

18. The method according to claim 17 wherein said primary tape feed step includes feeding tape by a drive roller in driving engagement with said fitting.

19. The method according to claim 18 including the step of feeding tape to locking engagement in-between said fitting and said drive roller preparatory to said primary tape feed step.

20. The method according to claim 19 including storing, in said tape reserve means, more tape than is required for use in wrapping said workpiece.

21. The method according to claim 20 including providing additional tape feed means in said tape reserve means and employing said additional tape feed means to aid in sustaining the rotation of said tape roll initiated by said air jets.

22. Apparatus for feeding tape from a tape roll to a workpiece to be wrapped with a length of tape, said apparatus comprising:
   a. a primary tape feed means for feeding tape to a workpiece; and
   b. an air impulse turbine, separate from said primary tape feed means for initiating rotation of said tape roll for feeding tape from said roll.

23. The apparatus according to claim 22 wherein said air impulse turbine includes a stationary air jet manifold and a turbine wheel rotatable with said tape roll and including a plurality of air fan blades.

24. Apparatus for feeding tape from a tape roll to a workpiece to be wrapped with a length of the tape, said apparatus comprising:
   a. a primary tape feed means for feeding tape to a workpiece; and
   b. an air tape feed turbine for initiating rotation of said tape roll for feeding tape from said roll, said air impulse turbine including stationary air jet manifold, a turbine wheel rotatable with said tape roll and including a plurality of air fan blades, and also including means for generating an impulse force and a steady state force, said impulse force being sufficient to overcome tape feed resistance of said roll and initiate rotation thereof and said steady state force being less than said impulse force and also being less than the force necessary to produce sustained rotation of said tape roll whereby tape override is prevented.

25. Apparatus for feeding tape from a tape roll to a workpiece to be wrapped with a length of the tape, said apparatus comprising:
   a. a primary tape means for feeding tape to a workpiece; tape feed
   b. an air impulse turbine for initiating rotation of said tape roll for feeding tape from said roll, said air impulse turbine including a stationary air jet manifold and a turbine wheel rotatable with said tape roll and including a plurality of air fan blades, and
   c. said tape roll comprising a length of tape wrapped upon a core, and wherein said air fan blades are integral with said core and wherein said apparatus includes means for rotatingly mounting said tape roll on said apparatus.

26. Apparatus for feeding tape from a tape roll to a workpiece to be wrapped with a length of the tape, said apparatus comprising:
   a. a primary tape feed means for feeding tape to a workpiece;
   b. an air impulse turbine for initiating rotation of said tape roll for feeding tape from said roll, said air impulse turbine including a stationary air jet manifold and a turbine wheel rotatable with said tape roll and including a plurality of air fan blades, and
   c. a tape reserve means intermediate said tape roll and said workpiece and means for threading said tape from said tape roll to said tape reserve means and then to said workpiece, and including means for providing said tape reserve means with a tape feed resistance less than that of said tape roll.

27. The apparatus according to claim 26 wherein said tape reserve means includes means for aiding the rotation of said tape roll initiated by said air turbine.

28. Apparatus for feeding tape from a tape roll to a workpiece to be wrapped with a length of the tape, said apparatus comprising:
   a. tape reserve means including means for holding an amount of tape;
   b. primary tape feed means for feeding tape from said tape reserve means to said workpiece; and
   c. secondary tape feed means for feeding tape from said tape roll to said tape reserve means, said secondary tape feed means including:
      i. a tape roll comprising a length of tape wound upon a core and said core including a turbine wheel integral therewith, said turbine wheel including a plurality of air fan blades;
      ii. means for mounting said core on a rotatable spindle on said apparatus; and
      iii. a stationary air jet manifold positioned adjacent said spindle and having at least a semi-circular periphery concentric with the axis of said spindle, and whereby said turbine wheel will be positioned adjacent said manifold.

29. The apparatus according to claim 28 wherein said manifold includes means for directing a plurality of air jets, in a plane substantially perpendicular to the axis of rotation of said spindle, against said blades.

30. The apparatus according to claim 29 including means for enclosing the spaces between said blades on at least two sides thereof.

31. The apparatus according to claim 28 wherein said air jet manifold has a semi-circular periphery having a plurality of air jet ports therein, said periphery having an outside diameter, said turbine wheel having a circular internal diameter slightly greater than said outside diameter of said air jet manifold, and means for positioning said tape roll on said spindle such that said turbine wheel and blades directly overlie said manifold air jet ports.

32. The apparatus according to claim 31 wherein said air jet manifold includes means for directing said air jets at said blades at an angle of about 45° to a radial from the center of said manifold.

33. The apparatus according to claim 31 wherein said air jet turbine is an impulse turbine and includes means for generating an impulse force and a steady state force, said impulse force being sufficient to overcome tape feed resistance of said roll and initiate rotation thereof and said steady state force being less than said impulse force and also being less than the force necessary to produce sustained rotation of said tape roll whereby tape override is prevented.

34. The apparatus according to claim 33 wherein said air jet manifold includes means for directing said air jets at said blades at an angle of about 45° to a radial from the center of said manifold.

35. The apparatus according to claim 34 wherein said primary tape feed means includes a drive roller in driving engagement with said fitting, and including means separate from said primary tape feed means for feeding tape to locking engagement in-between said fitting sand said drive roller, and wherein said tape reserve means includes means for sustaining the rotation of said tape roll initiated by said air turbine.

36. The apparatus according to claim 31 including a brake positioned in the cut out portion of said manifold and radially inside said turbine wheel, and including a movable brake shoe for brakingly engaging said spindle, and including means for withdrawing said brake shoe away from said spindle to allow said spindle to rotate.

37. A method for feeding tape from a tape roll to a workpiece to be wrapped with a length of the tape, said method comprising:
   a. feeding tape to a workpiece by a primary tape feed means; and
   b. initiating rotation of the tape roll by providing said tape roll with a core that is at least partially hollow and having a chamber therein and having gear teeth integral with said core and located in said chamber,
   c. providing an electric motor, connected to a drive gear in meshing engagement with said gear teeth, and
   d. rotating said core by energizing said electric motor.

38. The method according to claim 37 including providing a drive roller in driving contact with said tape, providing a second electric motor connected to said drive roller, and wherein said tape feeding step comprises energizing said second electric motor to rotate said drive roller.

39. A method for feeding tape from a tape roll to a workpiece to be wrapped with a length of the tape by a primary tape feed means, said method comprising:
   a. providing a tape reserve means, threading said tape from said tape roll to said tape reserve means and then to said workpiece, said tape reserve means holding a quantity of tape and providing said tape reserve means with a lower tape feed resistance than that of said tape roll;
   b. feeding tape, by said primary tape feed means, from said tape reserve means to said workpiece and wrapping said tape onto said workpiece; and
   c. feeding tape, by a secondary tape feed means, from said tape roll to said tape reserve means to re-fill said tape reserve means, said step of feeding tape by said secondary tape feed means comprising providing said tape roll as a length of tape wound upon a hollow core having gear teeth integral therewith, providing an electric motor connected to a drive gear, mounting said core on a rotatable spindle with said gear teeth in meshing engagement with said drive gear of said electric motor, and energizing said motor for initiating rotation of said tape roll.

40. The method according to claim 39 including providing a drive roller in driving contact with said tape, providing a second electric motor connected to said drive roller, and wherein said step of feeding tape by said primary tape feed means comprises energizing said second electric motor to rotate said drive roller.

41. Apparatus for feeding tape from a tape roll to a workpiece to be wrapped with a length of the tape, said apparatus comprising:
   a. a primary tape feed means for feeding tape to a workpiece; and
   b. said tape roll having gear teeth thereon,
   c. an electric motor, and
   d. a drive gear, said electric motor being connected to said drive gear, and said drive gear being in meshing engagement with said gear teeth for initiating rotation of said tape roll for feeding tape from said roll.

42. The apparatus according to claim 41 wherein said primary tape feed means includes a second electric motor.

43. The apparatus according to claim 41 wherein said tape roll comprises a length of tape wrapped upon an at least partially hollow core having a chamber therein and wherein said gear teeth are integral with said core and located in said chamber and wherein said apparatus includes means for rotatably mounting said tape roll on said apparatus.

* * * * *

UNITED STATES PATENT OFFICE
CERTIFICATE OF CORRECTION

PATENT NO. : 3,893,636
DATED : July 8, 1975
INVENTOR(S) : Walter R. Wise & Nicholas L.A. Martucci It is certified that error appears in the above-identified patent and that said Letters Patent are hereby corrected as shown below:

Claim 24, line 6, after air delete "tape feed" and insert therefor --impulse--.

Claim 25, line 4, after tape insert --feed--.

Claim 25, line 5, delete "tape feed".

Claim 35, line 5, delete "sand" and substitute therefor --and--.

Signed and Sealed this fourteenth Day of October 1975

[SEAL]

Attest:

RUTH C. MASON
Attesting Officer

C. MARSHALL DANN
Commissioner of Patents and Trademarks